(12) United States Patent
Meggiolan

(10) Patent No.: US 6,688,704 B2
(45) Date of Patent: Feb. 10, 2004

(54) BICYCLE WHEEL HUB

(75) Inventor: Mario Meggiolan, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 10/073,410

(22) Filed: Feb. 13, 2002

(65) Prior Publication Data

US 2002/0109398 A1 Aug. 15, 2002

(30) Foreign Application Priority Data

Feb. 13, 2001 (IT) ..................................... TO2001A0118
Feb. 13, 2001 (IT) ..................................... TO2001A0119
Feb. 13, 2001 (IT) ..................................... TO2001A0117

(51) Int. Cl.$^7$ ............................................. B60B 27/00
(52) U.S. Cl. ............................... 301/110.5; 301/64.701; 29/894
(58) Field of Search ..................... 301/64.701, 64.702, 301/95.102, 95.103, 110.5, 110.6, 64.6, 64.7; 264/480; 29/894, 895

(56) References Cited

U.S. PATENT DOCUMENTS 3,917,352 A * 11/1975 Gageby ................. 301/64.703
4,017,348 A * 4/1977 Shumaker ................... 156/189
4,213,234 A * 7/1980 Ware ....................... 29/894.322
4,294,490 A * 10/1981 Woelfel ................. 301/64.703
4,532,097 A * 7/1985 Daniels et al. ............... 264/258
4,832,414 A * 5/1989 Jones ..................... 301/64.703
5,773,108 A * 6/1998 Casebolt ..................... 428/36.1

FOREIGN PATENT DOCUMENTS

DE 3406650 A1 9/1985
DE 2165498 A1 * 4/1996 ............. B60B/3/00

* cited by examiner

Primary Examiner—S. Joseph Morano
Assistant Examiner—Frantz F. Jules
(74) Attorney, Agent, or Firm—Volpe and Koenig, P.C.

(57) ABSTRACT

A one-piece wheel hub of a bicycle wheel made from layered structural fiber based material, preferably carbon fiber material. The wheel hub is preferably formed by applying layers of the fiber based material to an expandable core to form a tubular body. The tubular body may be cured, during which time the core expands, by applying radial pressure to the tubular body.

8 Claims, 11 Drawing Sheets

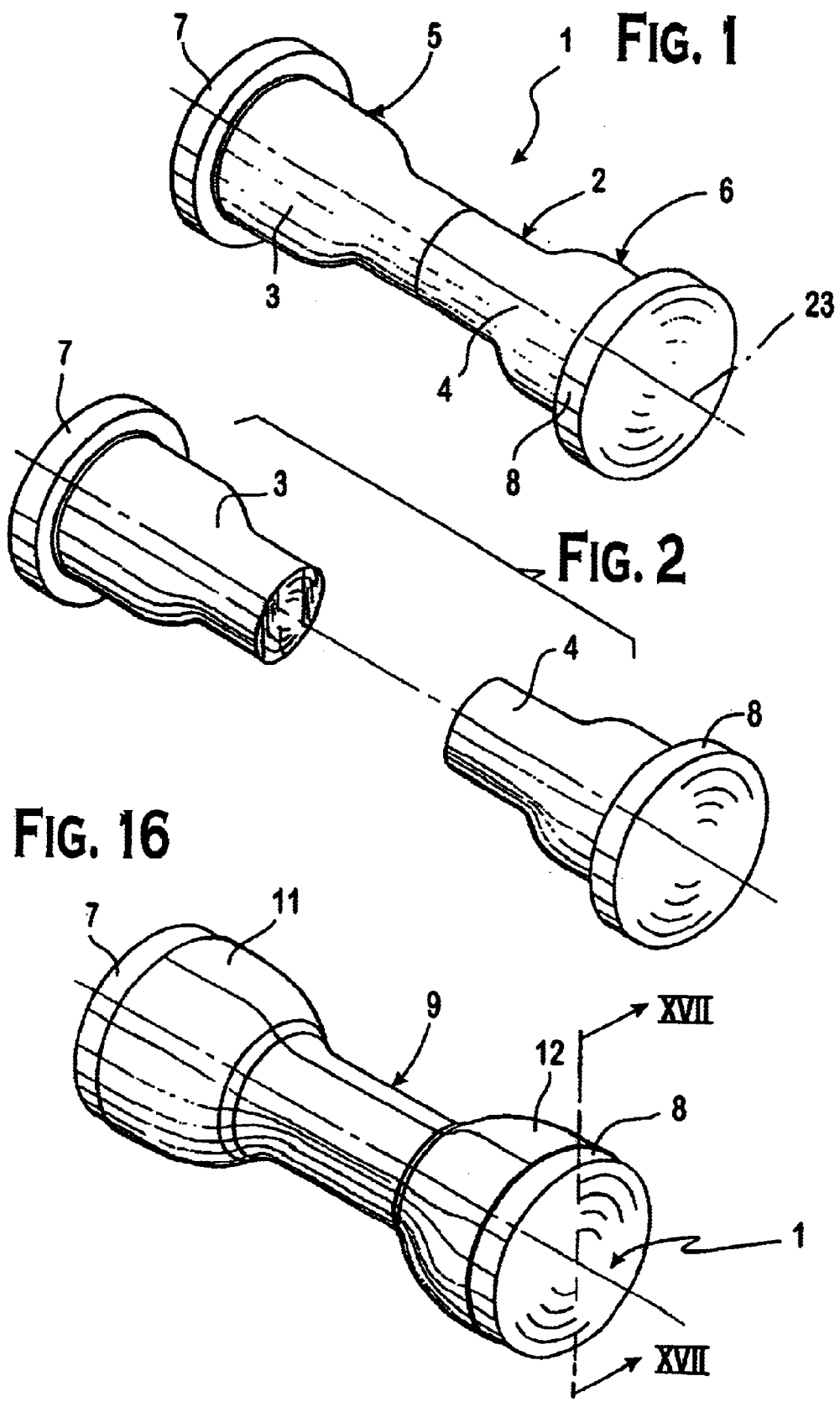

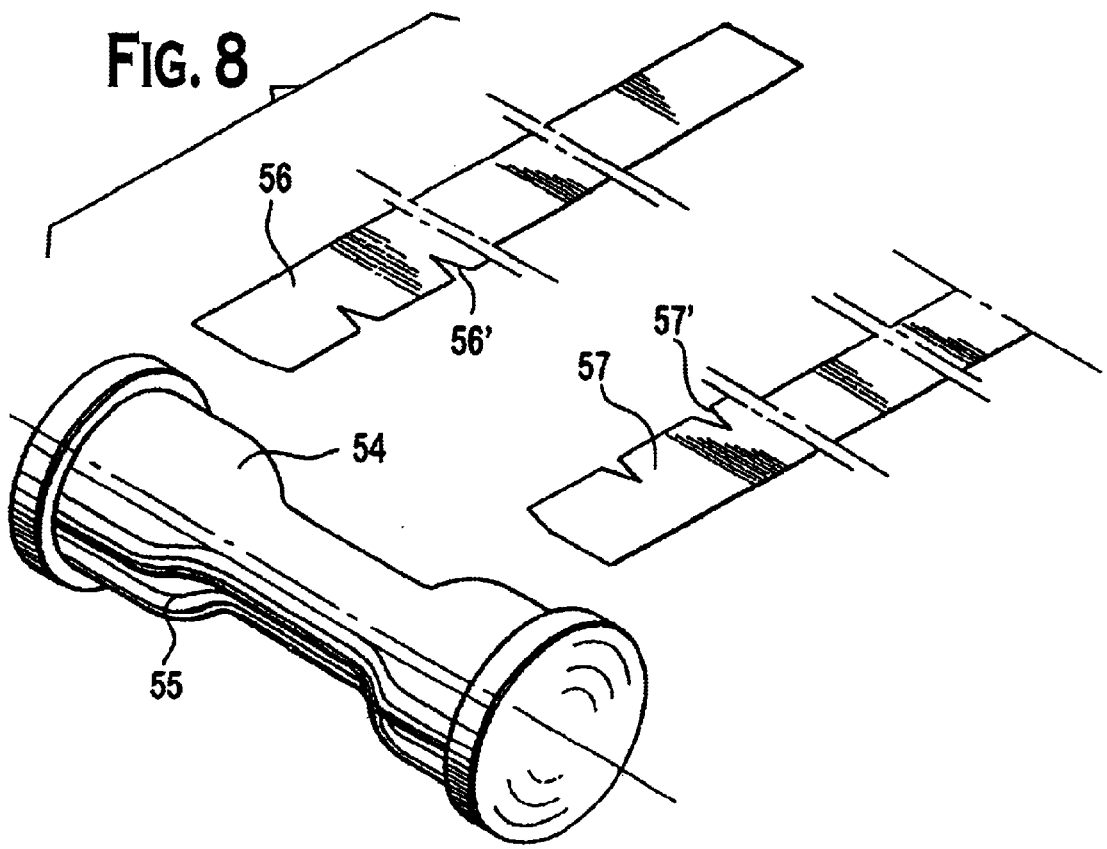
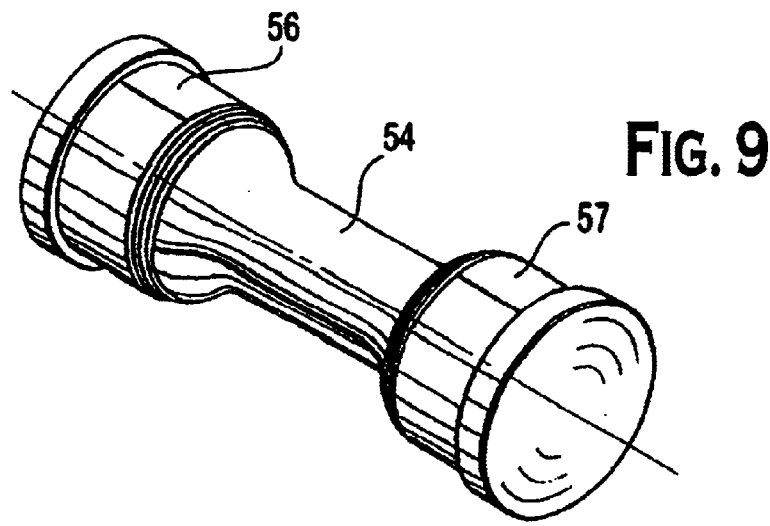

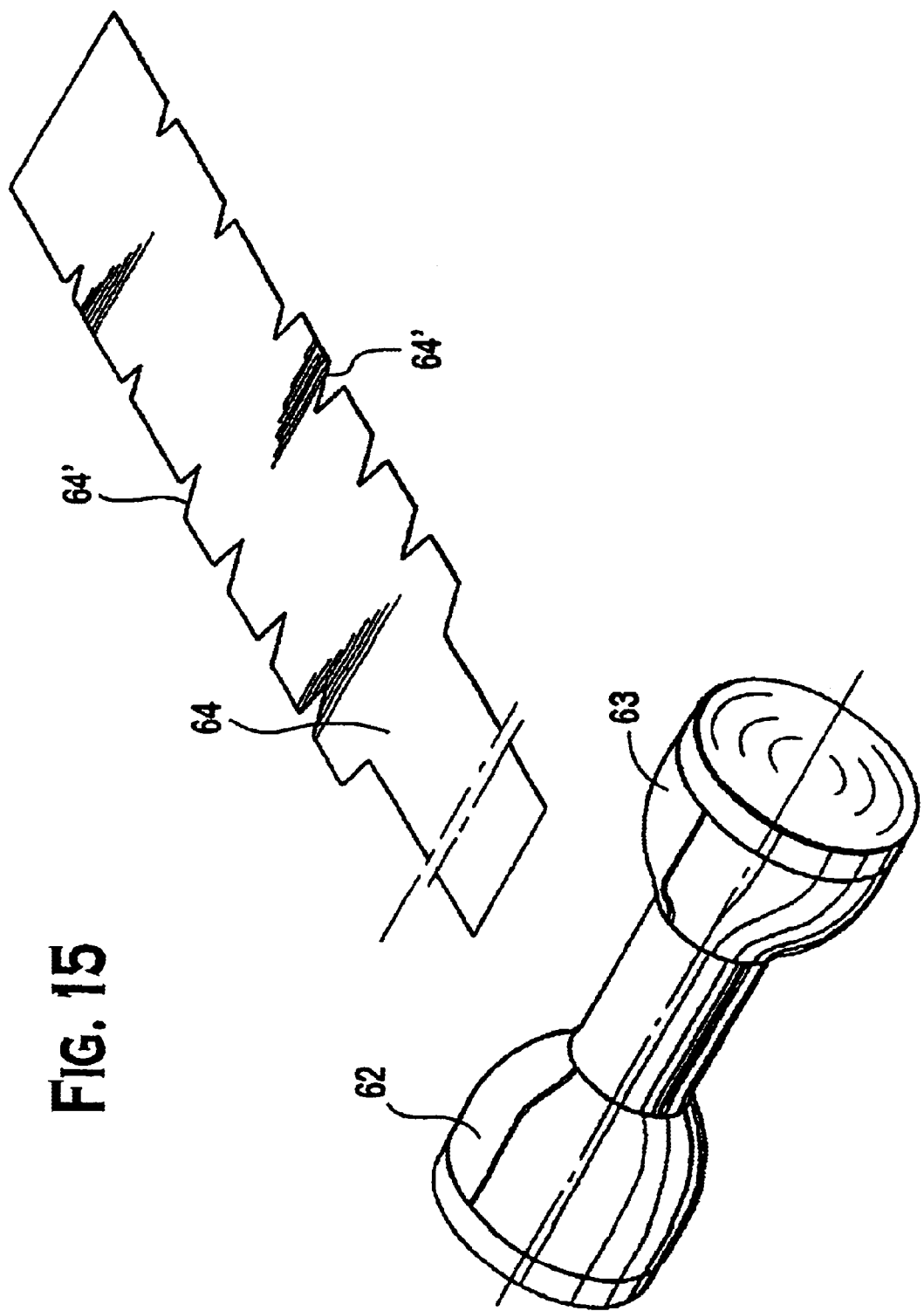

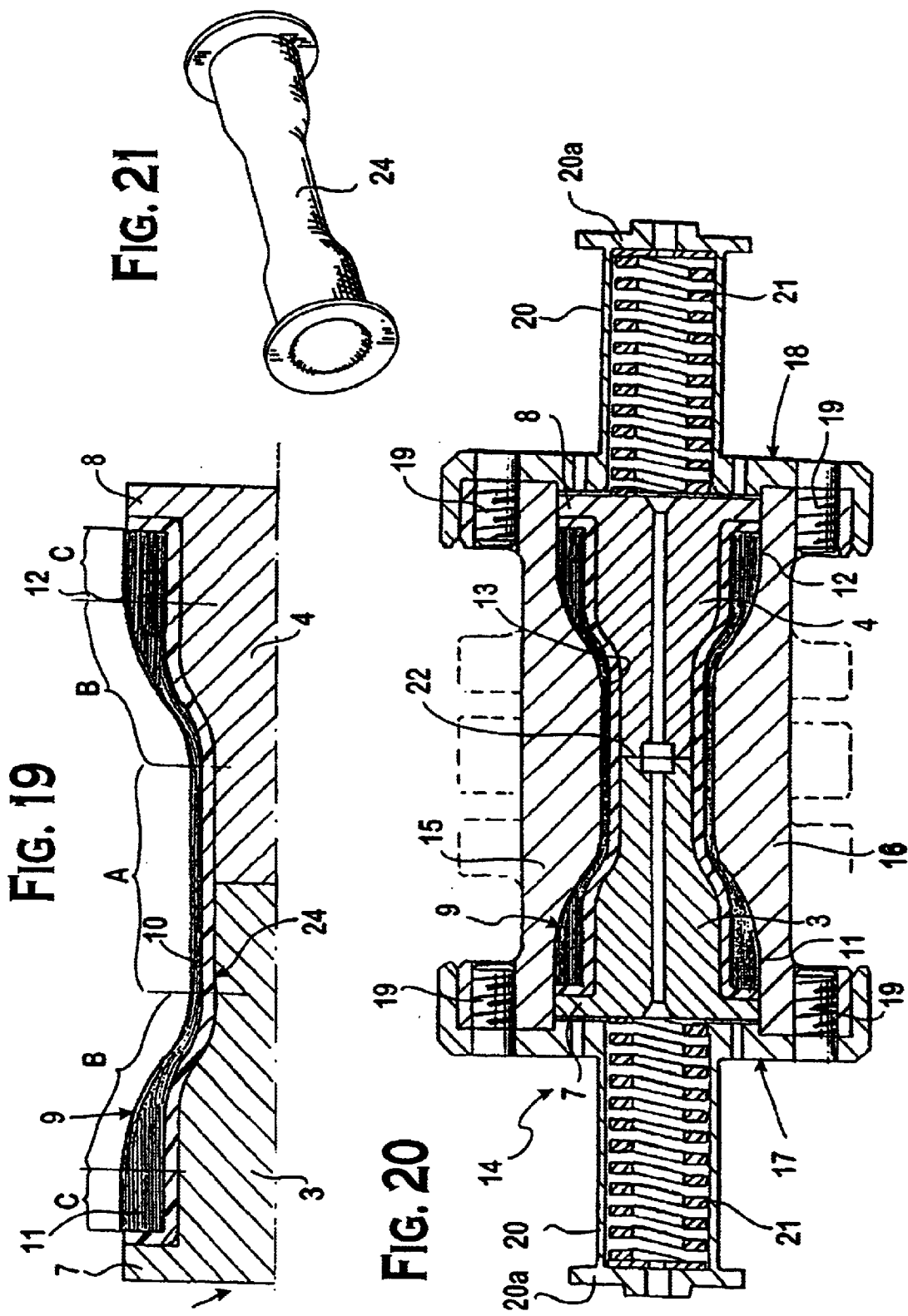

FIG. 22
FIG. A
FIG. B
FIG. C
FIG. D
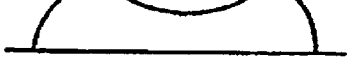
FIG. E
FIG. F
FIG. G
FIG. H
FIG. I
FIG. L
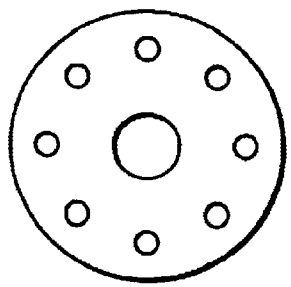
FIG. M
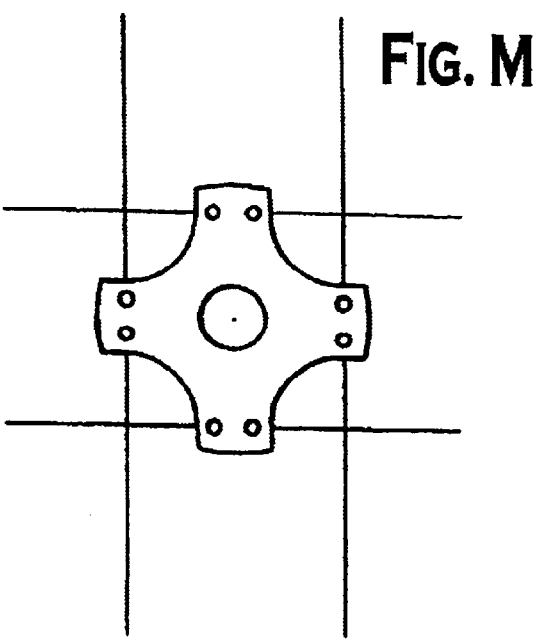

BICYCLE WHEEL HUB

BACKGROUND OF THE INVENTION

This invention relates to a method for fabricating the hub of a bicycle wheel, an apparatus for implementing the method and the bicycle wheel hub obtained by means of the said method.

The Applicant has recently conducted various studies and tests to make bicycle components, particularly bicycle wheel hubs, especially for spoke wheel competition bicycles, using structural fiber based material, typically carbon fiber based material. The advantage offered by this type of material is that of being lighter in weight with respect to the metallic materials used in the past given equal structural characteristics. Making a hub out of a single part of carbon fiber based material was difficult, at least utilising the technologies available at that time, due to the typical conformation of the bicycle wheel hub of the type described above. The hubs used in modern bicycle wheels present a complex cylindrical shape, with a central constant diameter section and two bell-shaped end sections with a wider diameter or other, even more complex, shapes. Additionally, it is desirable for the hub thickness to progressively increase from the central section towards the hub ends, so to ensure the necessary resistance characteristics in all areas of the hub, particularly on the ends, where the wheel spokes are anchored, while ensuring minimal weight at the same time.

The need of making a tubular body with the complex shapes described above has made it impossible to make the hub from a single part of structural fiber material, such as carbon fiber material.

SUMMARY OF THE INVENTION

The object of this invention is to overcome this technical problem.

In view of achieving this object, the invention provides a method for fabricating a bicycle wheel hub, characterised in that it comprises the following steps:
  providing an expandable core,
  applying a number of layers of structural fiber fabric incorporated in a plastic material matrix around the core to form a layered tubular body of predetermined shape and thickness around the core,
  arranging the core with the layered tubular body formed thereon in the cavity of a mold,
  increasing the temperature of the mold to a value sufficient to cause reticulation of the plastic material matrix,
  expanding the core for applying a pressure on the tubular body inside the mold, and
  removing the tubular body from the mold and from the core, so as to obtain a bicycle hub formed of a single piece of structural fiber material.

In a first embodiment, the expandable core is made of a synthetic material presenting a thermal dilatation coefficient exceeding $5 \times 10^{-15}$ mm/° C. and a maximum continuous heat resistance equal to at least 80° C, the expansion of the core being obtained through the dilation of the material forming the core when the temperature of the mold is increased.

Preferably, in this embodiment, the material forming the core has a thermal dilation coefficient exceeding $9 \times 10^{-5}$ mm/° C. and a maximum continuous thermal resistance temperature exceeding 100° C.

Again preferably, the material forming the core can be either PTFE (polytetrafluoroethene), or FEP (fluorinated ethene propene), or PCTFE (polychlorotrifluoroethene), or PVDF (polyfluorodivinylidene), or PE-HD (high density polyethylene).

The use of PTFE is widely preferred, due to the anti-adherence properties of this material, which are useful for detaching the core from the structural fiber molded body, as well as its high continuous thermal resistance (260° C.), for its good thermal conductivity (0.25 W/m° C.) and for its good thermal capacity (specific heat), equal to 1.045 kJ/kg° C.

The method, which main phases are outlined above, can be used in general to make hubs of all shapes, also different from that described above. A highly preferred characteristic of this method is in the arrangement of the aforesaid core made of high thermal dilation synthetic material, preferably PTFE. This material presents the characteristic of being subject to high thermal dilation at relatively low temperatures, in the order of temperatures at which the plastic material in which the structural fiber fabric is incorporated reticulates.

In a second embodiment of the method of the invention, the expandable core includes a body of metal material covered with a deformable sheath made of an elastomeric material, the expansion of the core being obtained through the dilation of the material forming the sheath when the temperature of the mold is increased.

Preferably, in this embodiment, the elastomeric material forming the aforesaid sheath has a thermal dilation coefficient exceeding $15 \times 10^{-5}$ mm/° C. and a maximum continuous heat resistance temperature exceeding 100° C. Still preferably, this material is a synthetic rubber of the type marketed under the trademark AIRCAST 3700 by Airtech International Inc., Huntington Beach, Calif., USA.

According to a further preferred feature of the second embodiment, the sheath is pre-formed according to the configuration of the core and is dimensioned in order to be applied on the core by slightly stretching it, so that the sheath adheres to the core due to its elasticity.

In a third embodiment of the method of the invention, the expandable core includes a body of metal material without any deformable sheath. In this embodiment the metallic core is divided in sectors, which can be expanded by means of mechanical means or, if provided by elastomeric junctions, by means of a gas injected inside the metallic core.

Structural fiber fabrics incorporated in a plastic material matrix are known and have been used for some time. They are made with yarn obtained from structural fibers, such as carbon fibers, for example. These fabrics are then subjected to a calendering process to associate them to a plastic material matrix, typically a thermosetting plastic material.

In the method of the invention, the structural fibers are selected among carbon fibers, glass fibers, Kevlar fibers, or any combinations thereof.

According to another important feature of the invention, the layers of fabric on the core comprise one or more fabric strips wrapped around at least one axially limited portion of the core, to confer thickness to the tubular body, as well as a plurality of fabric plies extending along the core axis, to confer resistance in the axial direction to the tubular body.

Finally, this invention also relates to a bicycle wheel hub, characterised in that it has a tubular body made of a plurality of layers of structural fiber fabric incorporated in a plastic material matrix, said layers including one or more fabric strips wrapped around at least one axially limited portion of the hub body as well as a plurality of fabric plies extending along the hub axis.

BRIEF DESCRIPTION OF THE DRAWING

This invention will be better explained by the following detailed descriptions with reference to the accompanying figures as non-limiting examples, whereas:

FIG. 1 generally indicates a perspective view of the core belonging to the apparatus used in the method according to a first embodiment of this invention, FIG. 2 illustrates a perspective view of the two elements forming the core in FIG. 1 in a reciprocally distanced condition, FIGS. from 3 to 15 are perspective views illustrating the various phases of applying the layers of the carbon fiber fabrics on the core shown in FIG. 1, FIG. 16 is a perspective view illustrating the core in FIG. 1 completely coated with layers of carbon fiber fabrics, FIGS. 19,20 are variant of FIGS. 17,18 corresponding to a second embodiment of the invention, FIG. 21 is a perspective view of the sheath of elastomeric material which is used in the method according to the second embodiment, and FIG. 22 shows wheel hubs with different shapes.

DETAILED DESCRIPTION OF THE INVENTION

Figure 3:
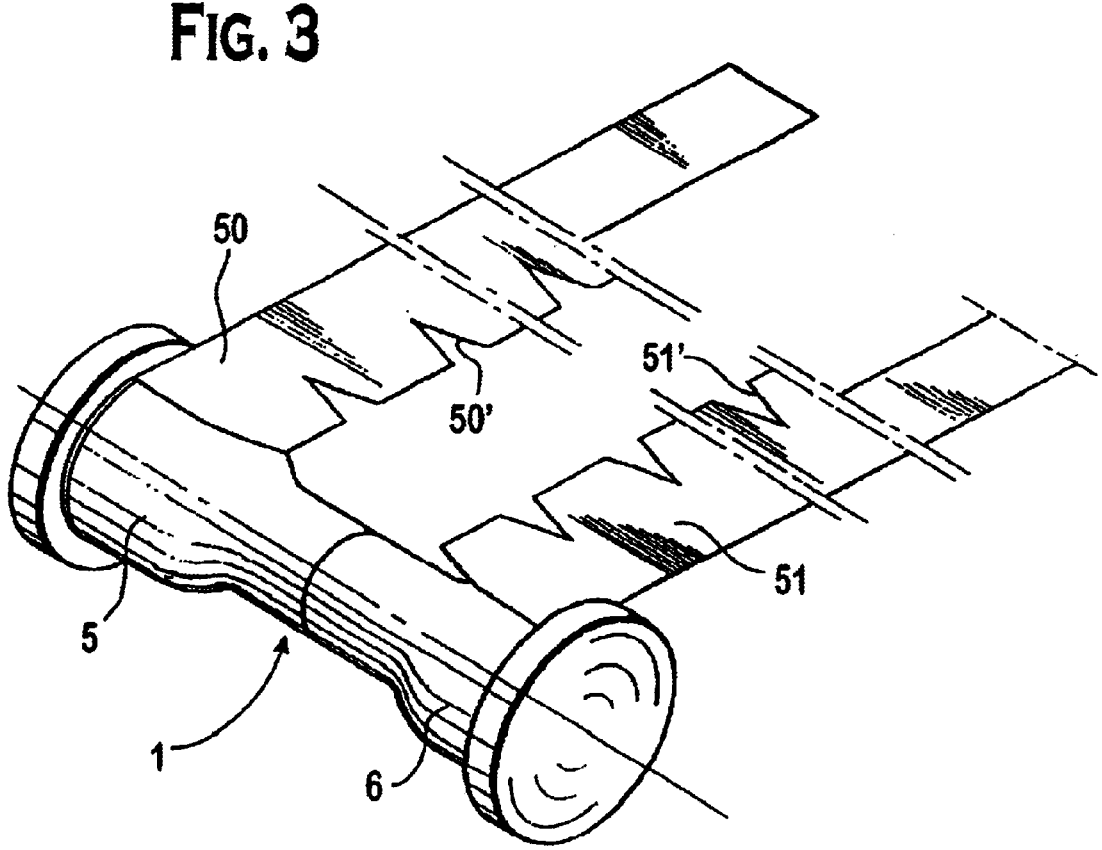

With reference to FIG. 1, numeral 1 generically indicates a generally cylindrical core, consisting of two separate elements 3, 4. In the example shown, each of the two elements 3, 4 is made of a single piece of PTFE. In the closed condition illustrated in FIG. 1, the two elements 3, 4, form a substantially cylindrical core, with a central section 2 presenting a constant diameter and two bell-shaped end sections 5, 6 with an enlarged diameter, ending with two ring flanges 7, 8.

With reference to FIGS. from 3 to 16, the core 1 is externally coated with layers of structural fiber based fabric (typically carbon based fabric) incorporated in a thermosetting plastic material matrix. The various phases of the layering process are illustrated in the FIGS. from 3 to 15.

Figure 4:
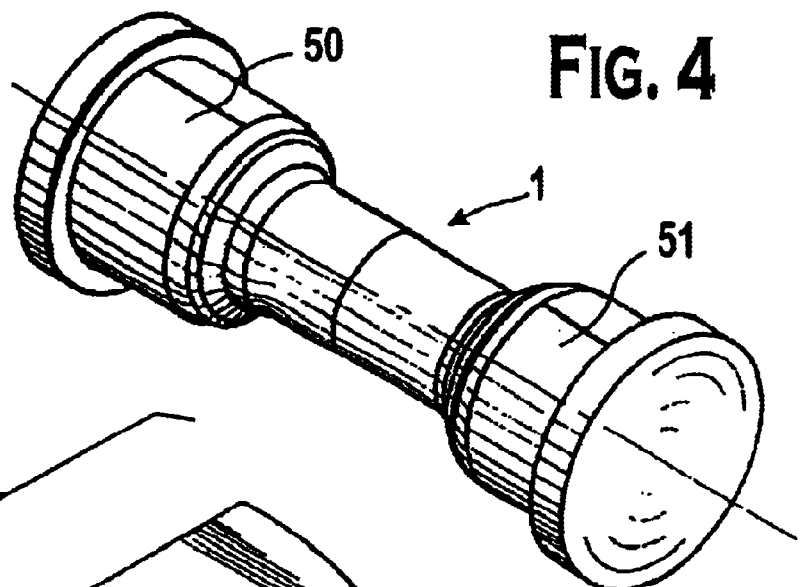

With reference to FIG. 3, in a first phase, a strip 50 of carbon fiber fabric is wrapped around on bell-shaped end 5 of the core 1 (e.g. five complete turns around the core). After this, the same operation is carried out on the strip of fabric 51 over the end 6 of the core 1. FIG. 4 illustrates the core 1 with two windings 50, 51 obtained at the end of the aforesaid phase.

The strips 50 and 51 present triangular cuttings 50' and 51' to allow to such strips to enclose a tubular area with different diameters without leaving empty spaces or forming overlappings.

Figure 7:
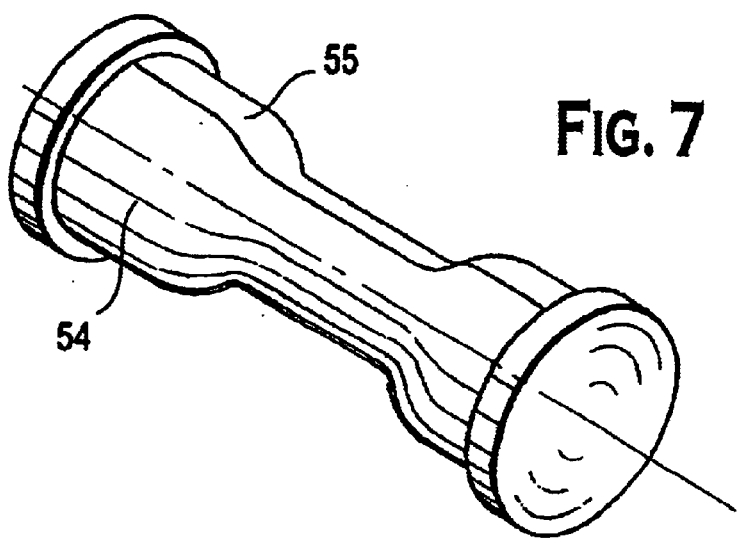
Figure 5:
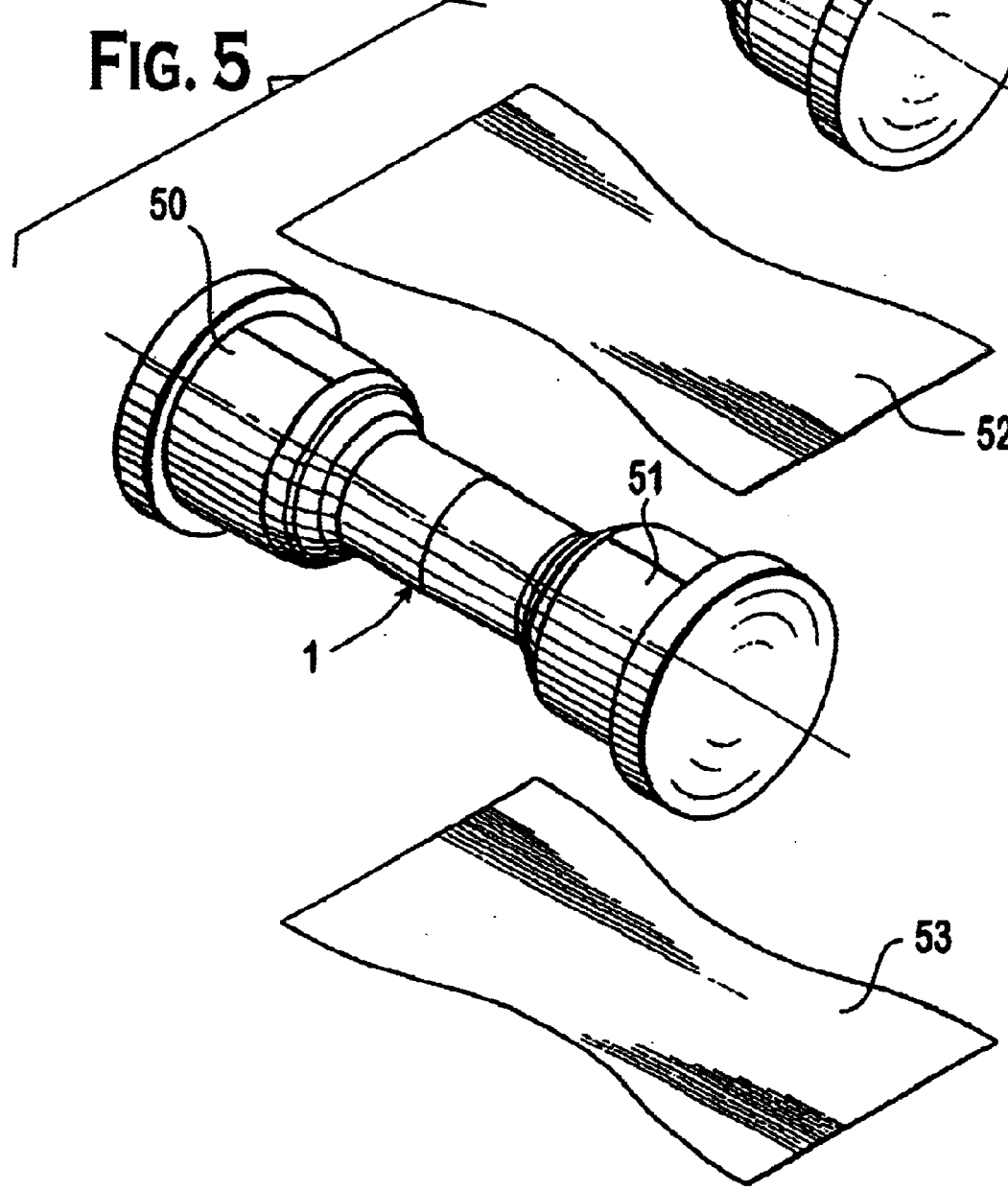
Figure 6:
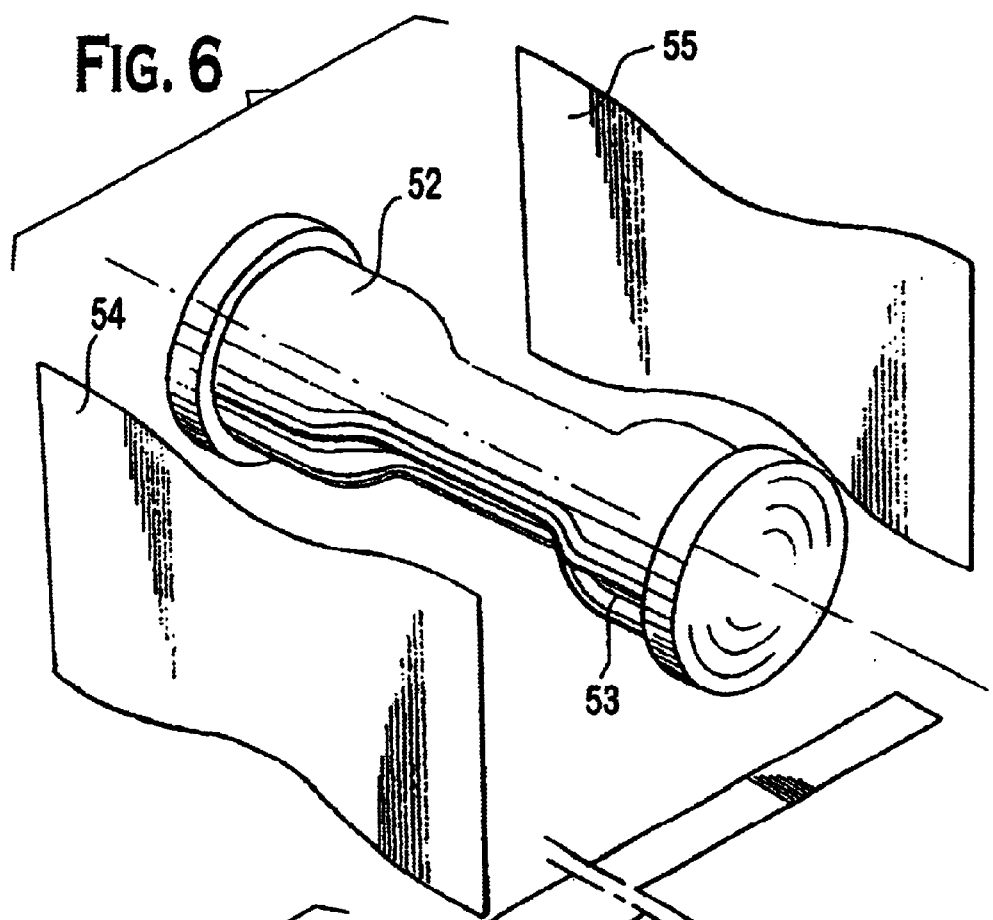

A first piece, or ply, 52, a second ply 53 (FIG. 5), a fourth ply 54 and a fifth ply 55 (FIG. 6) are then applied to the body thus obtained in four subsequent phases. All the plies 52, 53, 54, 55 extend for the entire axial length of the core, while each one only partially covers the core in the circumferential direction. As can be seen in FIGS. 5, 6, they are applied on four different sides, arranged at an angle of 90° one with respect to the other. Firstly, two plies 52, 53, which are diametrically opposite are applied, after which two other plies 54, 55, which are also diametrically opposite and oriented at 90° with respect to the plies 52, 53 are applied. In this way a couple of plies cover the entire circumference of the tubular body and the junctions of two couples of plies are alternated, in particular spaced apart of 90°. FIG. 7 illustrates the structure obtained at the end of the phases illustrated in FIGS. 5, 6. The function of the plies described above is very important, because the plies connect the strips on the end of the core thus providing axial resistance to the layered body.

Figure 10:
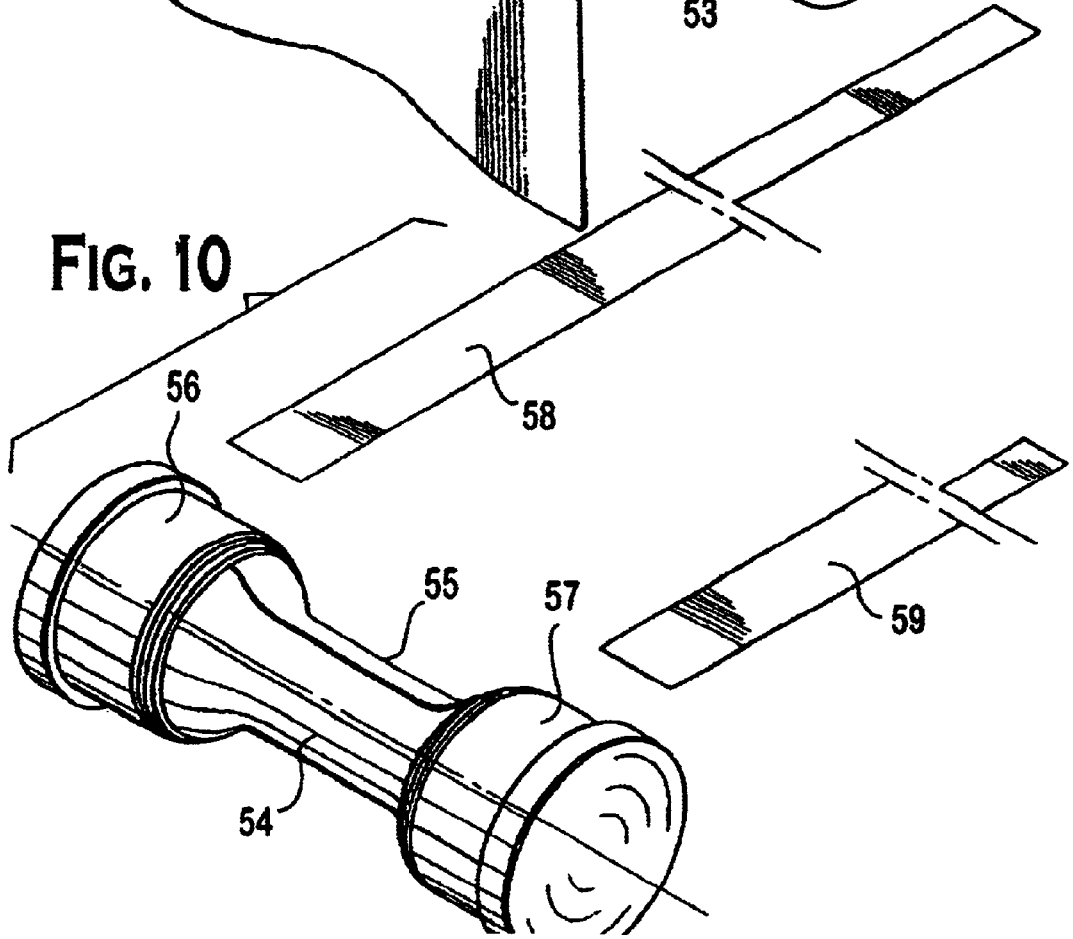
Figure 11:
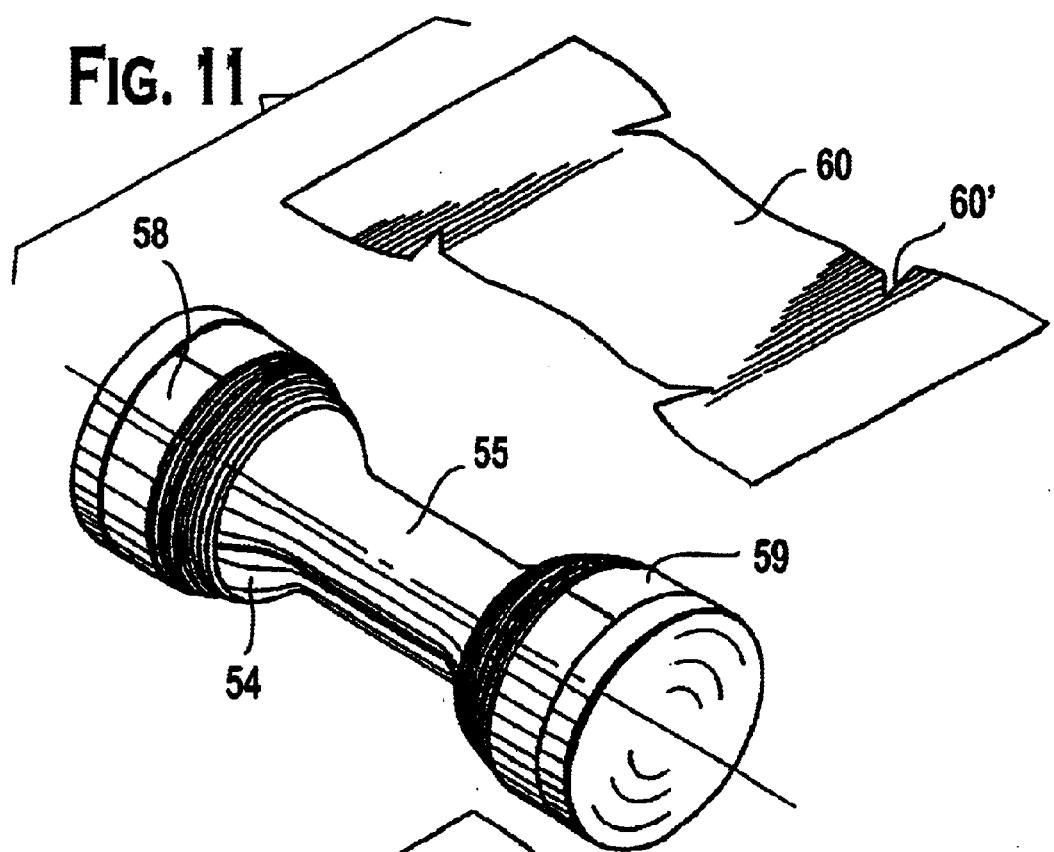
Figure 12:
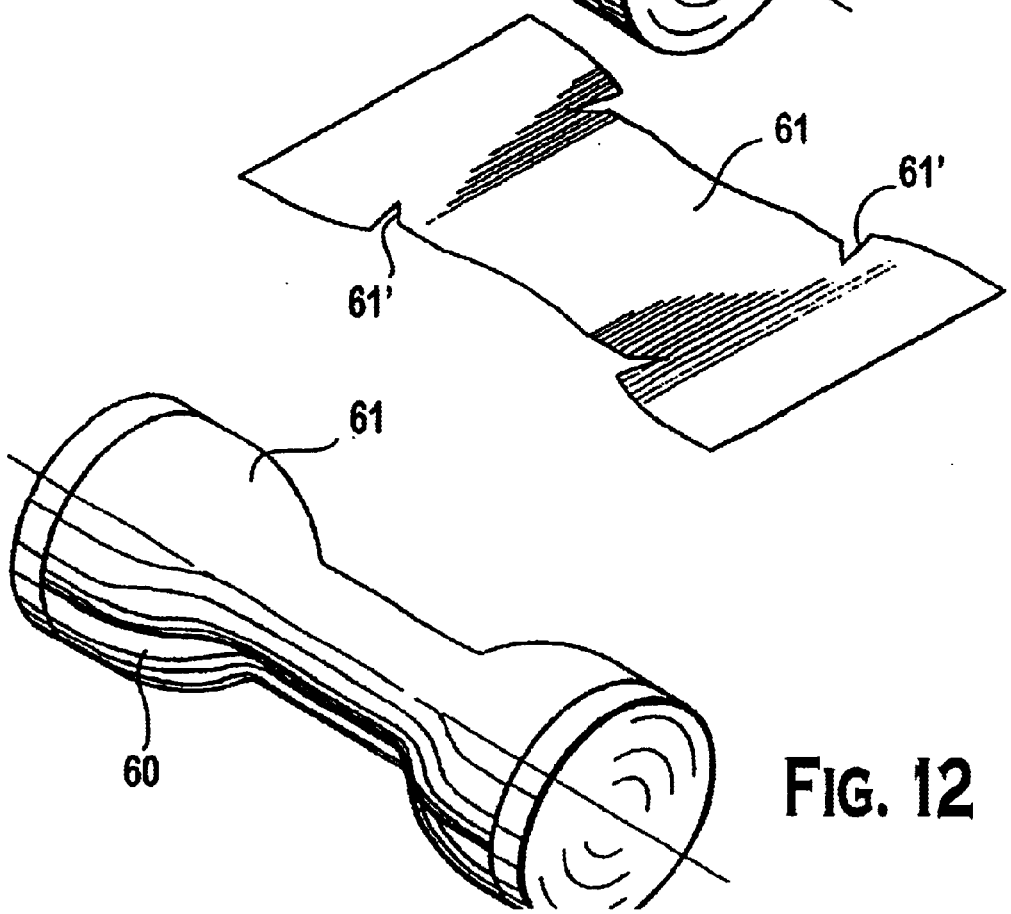

At the end of the phase described above, two strips 56, 57 (presenting triangular cuttings 56' and 57' —FIG. 8) are wrapped over the applied layers in subsequent phases, in correspondence to the ends of the core so to obtain the structure shown in FIG. 9. At this point, two additional strips 58, 59 (presenting triangular cuttings 58' and 59') are additionally wrapped over the end of the core (FIG. 10), after which two additional plies 60, 61, (presenting triangular cuttings 60' and 61') which are diametrically opposite and which shape is shown in FIG. 11 are applied. The plies 60, 61 are obviously applied in two subsequent moments, to obtain the structure shown in FIG. 12, where said plies join the end layers so to additionally increase the axial resistance of the layered body.

Figure 13:
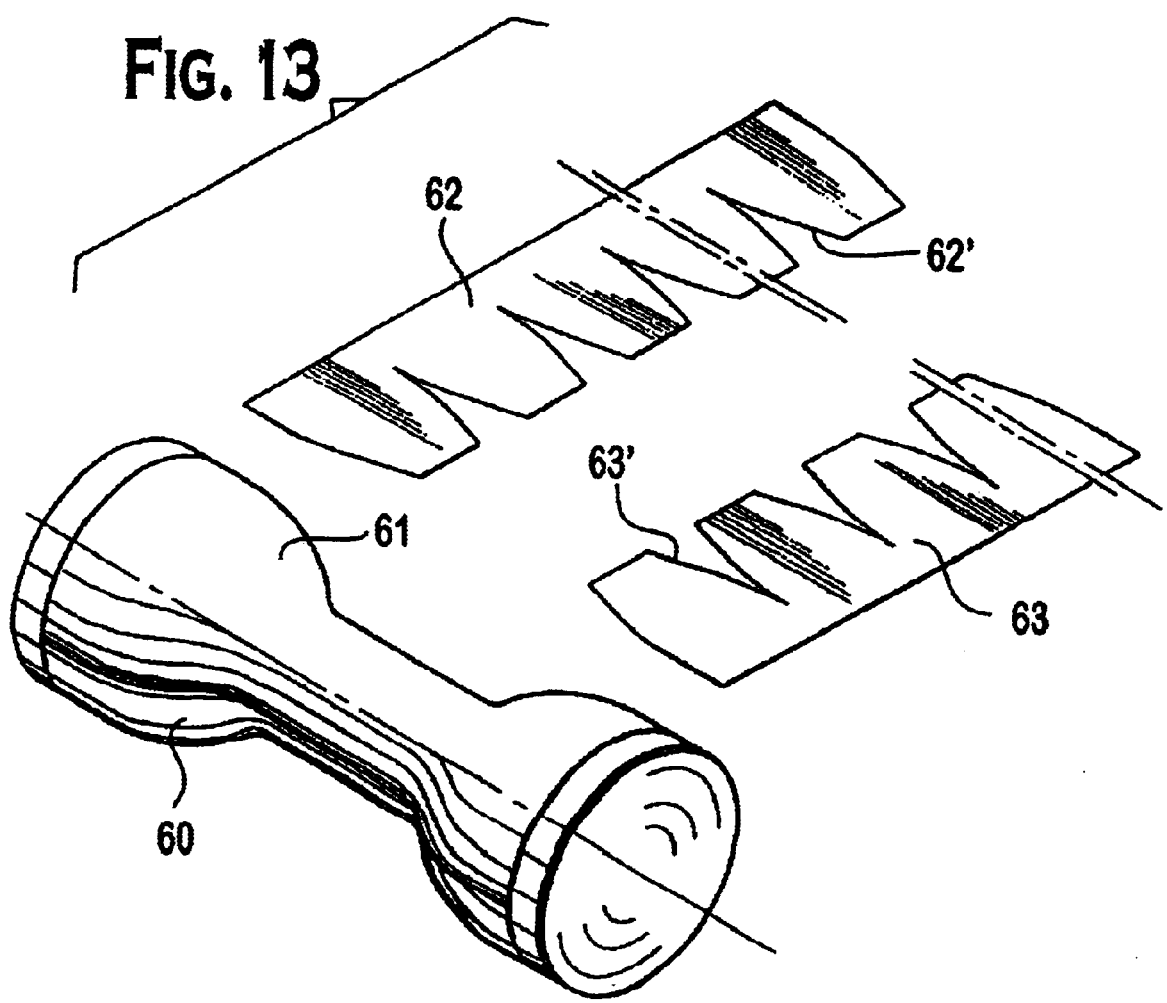
Figure 14:
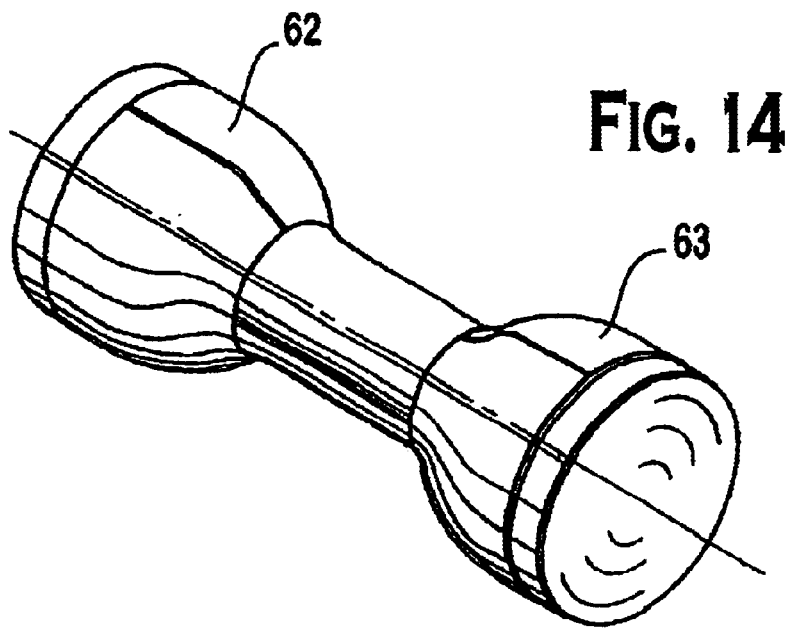

The method ends with the application of two additional strips 62, 63, (presenting triangular cuttings 62' and 63') which shape is shown in FIG. 13, which are wrapped around the ends of the core in two subsequent moments so to obtain the structure visible in FIG. 14, after which a last strip 64 is applied, which shape is shown in FIG. 15, and wrapped around the central part of the core, so to finally obtain the structure shown in FIG. 16.

The illustrated strips 50, 51, 56, 57, 62, 63 present triangular cuttings 50', 51' 56', 57', 62' 63' on one side, but they could present triangular cuttings on both sides. Said strips can also present, on one or on both sides, cuttings of other shapes, such as circular, oval, squared, rectangular, rectilinear and so on, or any combination thereof, the cuttings being perpendicular or inclined with respect to the edges of the strips. Further, it is also possible to choose the number, the depth, the width and the inclination of the cuttings. The strips 50, 51, 56, 57, 62, 63 could also present, on one or on both sides, extensions of different shapes, such as circular, oval, squared, rectangular, triangular and so on, or any combination thereof, the extensions being perpendicular or inclined with respect to the edges of the strips. Further, it is also possible to choose the number, the depth, the width and the inclination of the extensions. Finally, a combination of cuttings and/or extensions, on one or on both sides of the strips can be chosen in such a way as to obtain substantially any kind of thickness and shape such as, for example, the ones showed in FIG. 22.

Figure 17:
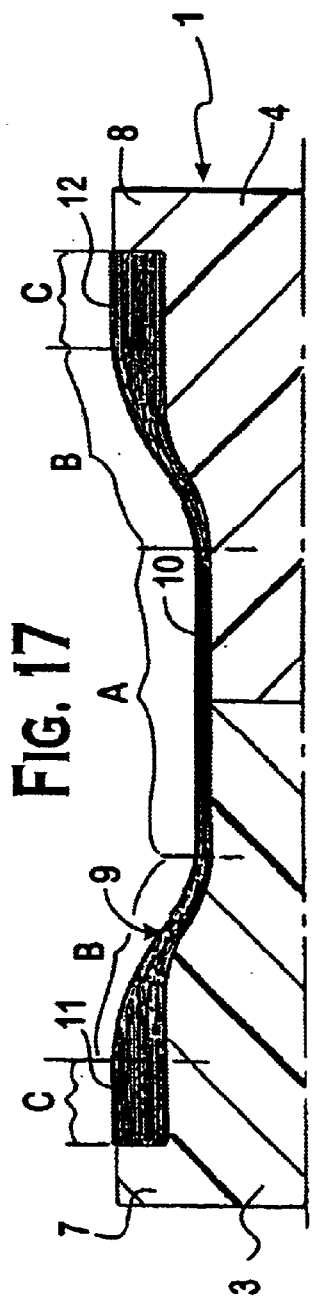
FIG. 17 is a partial cross-section view of the assembly illustrated in FIG. 16, with two elements forming the core and the pre-formed tubular layered body over them.

As described, the strips and the plies are arranged alternately with each other, so as to achieve the best result in terms of thickness and axial resistance Once the method is ended, a tubular body 9 is formed on the core (FIG. 16) a central constant section 10, and two bell-shaped ends 11, 12, which diameter is larger. Furthermore, the thickness of the pre-formed tubular body 9 progressively increases from the central section 10 in the direction of the ends or, as can be seen in FIG. 17, there is a central part (A) of constant section, end parts (C) with constant section, but larger than the central one and intermediate parts (B) with increasing sections. Finally, the two ring end flanges 7, 8 of the core 1 axially contain the ends of the pre-formed tubular body 9.

Figure 18:
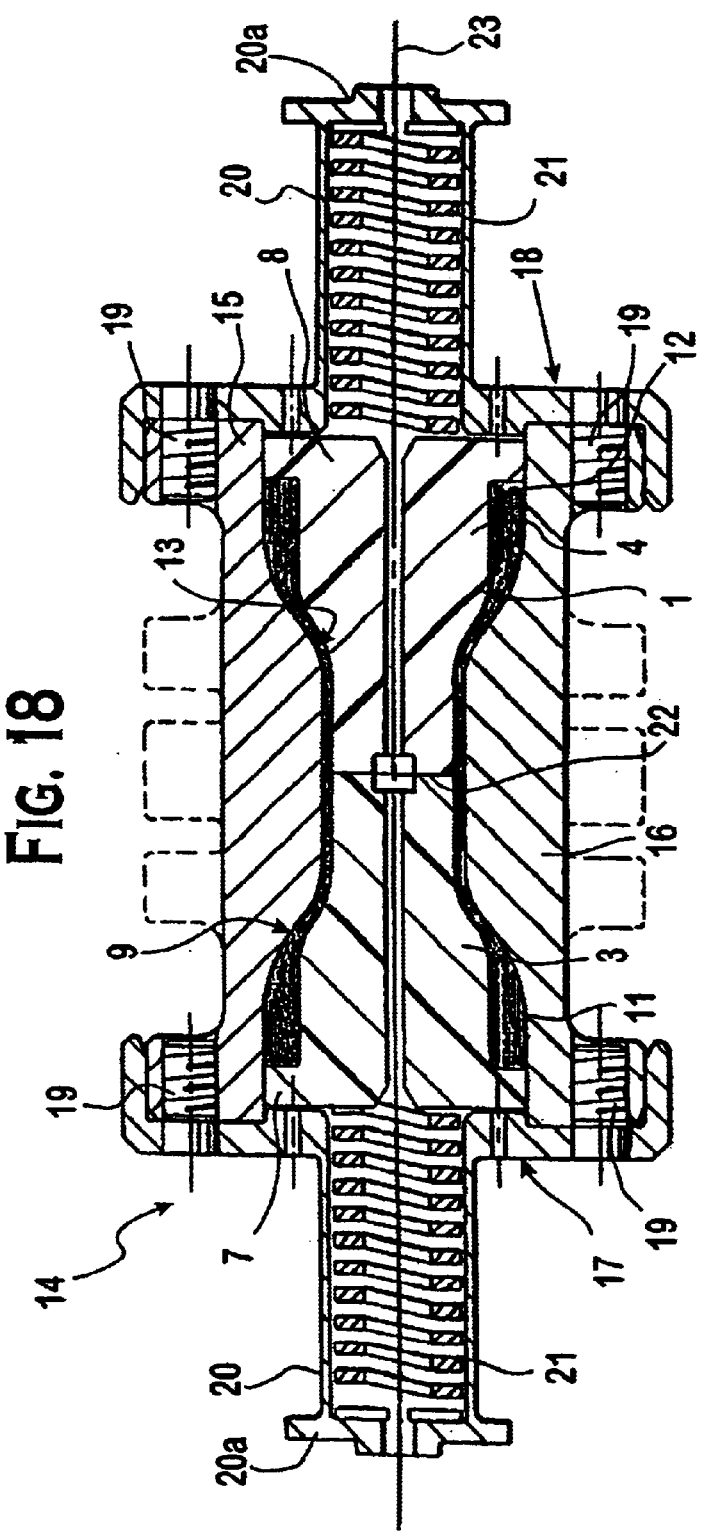
FIG. 18 is a cross-sectional view of the mold usable in the method according to the first embodiment.

The assembly consisting of the core 1, comprising the two elements 3, 4 and the pre-formed tubular body 9 wrapped around it, is positioned in the cylindrical cavity 13 of a molding apparatus 14 (see FIG. 18). The cylindrical cavity 13 is formed by an upper half mold 15 and a lower half mold 16, presenting a conformation which corresponds to that of the external surface of the hub to be obtained, i.e. substantially corresponding to the external surface of the pre-formed tubular body 9 illustrated in FIG. 16. The ends of the cavity 13 are closed by two caps 17, 18, which are fastened by means of screws 19 to two end flanges of the two half molds 15, 16. Each of the two caps 17, 18 incorporates a central cylindrical case 20 in which a respective helical spring 21 is arranged. Each of the two helical springs 21 is axially interposed between a bottom wall 20a of the respective tubular case 20 and the respective end surface of the core 1. The two springs 21 elastically press the two elements 3, 4 of the core 1 against each other so that these elements are kept in contact corresponding to their contact plane 22, which is orthogonal to the axis 23 of the core 1.

After arranging the assembly consisting of the core 1 and the pre-formed tubular body 9 wrapped on the core inside the mold, the mold is taken to a temperature sufficient to cause the reticulation of the thermosetting plastic material matrix belonging to the tubular body 9, for example to a temperature comprised in the range from 80° C. to 200° C. This temperature increase is maintained preferably for a time comprised in the range from 10 minutes to 3 hours, preferably in the range from 30 minutes to 3 hours. In this way, the thermosetting matrix reticulates, while the PTFE forming the two elements 3, 4 of the core 1 dilates. This dilation is mainly impressed radially outwards, since the flanges 7, 8 are pressed against the ends of the pre-formed tubular body 9 by the two springs 21. Consequently, a radial pressure is exerted outwards against the tubular body 9, which is thus pushed against the wall of the cylindrical cavity 13. In this way, a uniform pressure is applied on all the parts of the pre-formed tubular body 9, despite the complex conformation of the body illustrated herein, with bell-shaped ends and a progressively increasing thickness, from the center to the ends. Naturally, during this phase, the springs 21 allow the two elements 3, 4 of the core to distance themselves slightly following the force exerted by the PTFE core against the ring flanges 7, 8.

At the end of the reticulation phase, a cooling phase follows, then the mold is opened and the assembly comprising the core 1 and the body 9 arranged upon it, is extracted. At this point, the elements 3, 4 forming the core 1 are extracted in opposite directions from the body thus obtained, forming the wheel hub according to this invention. The hub thus obtained presents the particularity of being made of structural fiber material, typically carbon fiber material, and being made of a single part, despite the complex geometrical shape described above. The product can naturally be subjected to additional machining (e.g. a set of radial holes can be drilled in the two bell-shaped ends for engaging the spokes) which make the part usable as a bicycle wheel hub.

Many other kinds of hubs with different shapes, illustrated in FIG. 22, can be obtained. In particular, symmetrical and asymmetrical hubs with respect to the intermediate plane, hubs with one or two flanges in proximity of one or both ends and hubs with cross-shaped flanges.

With reference to FIGS. 19,20 and 21, which relate to a second embodiment of the method of the invention, the core 1 is formed by two elements 3,4 of metal material, e.g. steel, and is externally covered with a sheath 24 made of a high thermal dilatation elastomeric material. Preferably, the elastomeric material forming the aforesaid sheath has a thermal dilation coefficient exceeding $15 \times 10^{-5}$ mm/° C. and a maximum continuous heat resistance temperature exceeding 100° C.

For example, said material forming the core sheath can be a synthetic rubber of the type marketed under the trademark AIRCAST 3700 by Airtech International Inc., Huntington Beach, Calif., USA. This material is preferred for its relatively high thermal dilation coefficient ($15 \times 10^5$ mm/° C.), as well as its high continuous heat resistance (232° C.), for its good thermal conductivity (2.59 W/m° C.) and for its good ultimate tensile stress (680%), which is important to facilitate removing the sheath from the internal surface of the finished product after extracting it from the module and after removing the core.

The sheath is pre-formed according to the configuration of the core (FIG. 4) with a central cylindrical section and two bell-shaped end sections and is preferably dimensioned so as to be applied onto the core by stretching it slightly so that the sheath is adherent to the core by effect of its elastic return.

Apart from the above indicated different structure of the core, the method remains identical to that described above with reference to the first embodiment. The assembly consisting of the core 1, comprising the two elements 3, 4, the sheath 24 and the pre-formed tubular body 9 wrapped around it, is positioned in the cylindrical cavity 13 of a molding apparatus 14 formed by an upper half mold 15 and a lower half mold 16, presenting a conformation which corresponds to that of the external surface of the hub to be obtained, i.e. substantially corresponding to the external surface of the pre-formed tubular body 9 illustrated in FIG. 21. The ends of the cavity 13 are closed by two caps 17, 18 which are fastened by means of screws 19 to two end flanges of the two half molds 15, 16. Each of the two caps 17, 18 incorporates a central cylindrical case 20 in which a respective helical spring 21 is arranged. Each of the two helical springs 21 is axially interposed between a bottom wall 20a of the respective tubular case 20 and the respective end surface of the core 1. The two springs 21 elastically press the two elements 3, 4 of the core 1 against each other so that these elements are kept in contact corresponding to their contact plane 22, which is orthogonal to the axis 23 of the core 1.

After arranging the assembly consisting of the core 1 and the pre-formed tubular body wrapped on the core inside the mold, the mold is taken to a temperature sufficient to cause the reticulation of the thermosetting plastic material matrix belonging to the tubular body 9, for example to a temperature comprised in the range from 80° C. to 200° C. This temperature increase is maintained preferably for a time comprised in the range from 10 minutes to 3 hours, preferably in the range from 30 minutes to 3 hours. In this way, the thermosetting matrix reticulates, while the synthetic rubber forming the sheath that covers the two elements 3, 4 of the core 1 dilates. This dilation is mainly impressed radially outwards, since the flanges 7, 8 are pressed against the ends of the pre-formed tubular body 9 by the two springs. Consequently, a radial pressure is exerted outwards against the tubular body 9, which is thus pushed against the wall of the cylindrical cavity 13. In this way, a uniform pressure is applied on all the parts of the pre-formed tubular body 9, despite the complex conformation of the body illustrated herein, with bell-shaped ends and a progressively increasing thickness, from the center to the ends. Naturally, during this phase, the springs 21 allow the two elements 3, 4 of the core to distance themselves slightly following the force exerted on the sheath 24 against the angular flanges 7, 8.

At the end of the reticulation phase, and after a subsequent cooling phase, the mold is opened and the assembly comprising the core 1 and the body 9 arranged upon it, is extracted. At this point, the elements 3, 4 and 10 forming the core are extracted in opposite directions from the body, after which the sheath 24, which initially remains associated to the internal surface of the tubular body, is extracted by elastic deformation. The hub thus obtained presents the particularly of being made of structural fiber material, typically carbon fiber material, and being made of a single part, despite the complex geometrical shape described above. The product can naturally be subjected to additional machining (e.g. a set of radial holes can be drilled in the two bell-shaped ends for engaging the spokes) which makes the part usable as a bicycle wheel hub.

The third embodiment differs from the second one by the fact that the metallic core is divided in sectors and it is not covered by any deformable sheath. In this embodiment the radial pressure to the tubular body is applied by mechanical means which act on the inside of the core, or by arranging the junctions of the metallic sectors with an elastomeric material, by injecting gas inside the metallic core. After the reticulation of the fabric matrix is obtained, and after a subsequent cooling phase, the internal pressure is stopped and the core comes back to its original dimensions, allowing the two elements of the core to be extracted from the reticulated tubular body.

Finally, the apparatus illustrated in FIG. 20 can obviously be modified by arranging a wall of high thermal dilatation material of the type shown above in correspondence to the surface of the mold cavity again by using a core made of two metallic material elements 3, 4. In this case, the thermal dilation of the wall of the cavity would determine the application of a radial pressure from the outside inwards on the external surface of the pre-formed tubular body 9 which would thus be squeezed on the metallic core.

Naturally, numerous changes can be implemented to the construction and forms of embodiment of the invention herein envisaged, all comprised within the context of the concept characterising this invention, as defined by the following claims.

For example, despite that this description and accompanying claims explicitly refer to a bicycle wheel hub, the method according to this invention can obviously be applied to manufacturing other components with a similar shape, particularly other bicycle components. Consequently, also these applications and the deriving products, fall within the scope of this invention.

What is claimed is:

1. A bicycle wheel hub, having a hollow tubular body with first and second ends and an interior diameter that is spaced from a central hub axis extending longitudinally through the tubular body, the tubular body comprising:

a plurality of layers of fabric strips, at least some of which have an extension defined by a plurality of reduced sections on an inside edge thereof each strip having fibre fabric incorporated in a plastic material matrix and extending about and spaced from the central hub axis over at least a portion of the tubular body, and a plurality of fabric plies, each ply having fibre fabric incorporated in a plastic material matrix, extending about the central hub axis and integral with the layers of fabric strips.

2. A bicycle wheel hub, having a hollow tubular body with first and second ends and an interior diameter that is spaced from a central hub axis extending longitudinally through the tubular body, the tubular body comprising:

a plurality of layers of fabric strips, at least some of the strips have extensions and recesses on at least one edge thereof, each strip having fibre fabric incorporated in a plastic material matrix and extending about and spaced from the central hub axis over at least a portion of the tubular body, and a plurality of fabric plies, each ply having fibre fabric incorporated in a plastic material matrix, extending about the central hub axis and integral with the layers of fabric strips.

3. A bicycle wheel hub, having a hollow tubular body with first and second ends and an interior diameter that is spaced from a central hub axis extending longitudinally through the tubular body, the tubular body comprising:

a plurality of layers of fabric strips, at least some of the strips have triangular recesses on at least one edge thereof, each strip having fibre fabric incorporated in a plastic material matrix and extending about and spaced from the central hub axis over at least a portion of the tubular body, and a plurality of fabric plies, each ply having fibre fabric incorporated in a plastic material matrix, extending about the central axis and integral with the layers of fabric strips.

4. A bicycle wheel hub, having a hollow tubular body with first and second ends and an interior diameter that is spaced from a central hub axis extending longitudinally through the tubular body, the tubular body comprising:

a plurality of layers of fabric strips, each strip having fibre fabric incorporated in a plastic material matrix and extending about and spaced from the central hub axis over at least a portion of the tubular body, and a plurality of fabric plies, each ply having a fibre fabric incorporated in a plastic material matrix, that are: paired on oppositely opposed sides of the tubular body; extended about and are spaced form the central axis in a different orientation than the fabric strip; and, are integral with the layers of fabric strips.

5. A bicycle wheel hub, having a hollow tubular body with first and second ends and an interior diameter that is spaced from a central hub axis extending longitudinally through the tubular body, the tubular body comprising:

a plurality of layers of fabric strips, each strip having fibre fabric incorporated in a plastic material matrix and extending about and spaced from the central axis over at least a portion of the tubular body, and a plurality of fabric plies, each ply having fibre fabric in a plastic material matrix, that are: arranged in at least two pairs that are angularly spaced relative to each other; extended about and are spaced form the central axis in a different orientation than the fabric strip; and, are integral with the layers of fabric strips.

6. The bicycle wheel hub according to claim 5, wherein the two pairs of diametrically opposite plies are spaced by approximately ninety (90°) degrees relative to each other.

7. A bicycle wheel hub, having a hollow tubular body with first and second ends and an interior diameter that is spaced from a central hub axis extending longitudinally through the tubular body, the tubular body comprising:

a plurality of layers of fabric strips, each strip having fibre fabric incorporated in a plastic material matrix and extending about and spaced from the central axis over at least a portion of the tubular body;

a plurality of fabric plies, each ply having fibre fabric incorporated in a plastic material matrix, extending about and spaced form the central axis and are integral with the layers of fabric strips; and, a cross shaped flange at one end of the tubular body.

8. A bicycle wheel hub, having a hollow tubular body with first and second ends and an interior diameter that is spaced from a central hub axis extending longitudinally through the tubular body, the tubular body comprising:

a plurality of layers of fabric strips, at least some of which have an extension defined by a plurality of reduced sections on an inside edge thereof each strip having fibre fabric incorporated in a plastic material matrix and extending about and spaced from the central hub axis in an orientation orthogonal to the central hub axis, and a plurality of fabric plies, each ply having fibre fabric incorporated in a plastic material matrix, located about the central hub axis in an orientation parallel to the central hub axis.

* * * * *

UNITED STATES PATENT AND TRADEMARK OFFICE
CERTIFICATE OF CORRECTION

PATENT NO. : 6,688,704 B2
DATED : February 10, 2004
INVENTOR(S) : Mario Meggiolan It is certified that error appears in the above-identified patent and that said Letters Patent is hereby corrected as shown below:

Title page,
Item [56], References Cited, FOREIGN PATENT DOCUMENTS, delete "DE 2165498 A1 * 4/1996" and insert therefor -- GB 2165498 A1 * 4/1986 --.

Column 4,
Line 50, after the word "resistance", insert -- . -- (period).

Column 6,
Line 3, after the word "coefficient", delete "(15 x $10^5$ mm/ºC.)" and insert therefor -- (15 x $10^{-5}$ mm/ºC.) --.

Column 7,
Line 3, delete the first word on the line "particularly" and insert therefor -- particularity --.

Column 8,
Lines 30, 45 and 61, after the word "spaced", delete "form" and insert therefor -- from --.

Signed and Sealed this

Tenth Day of August, 2004

JON W. DUDAS
*Acting Director of the United States Patent and Trademark Office*